United States Patent
Matsumura et al.

[11] Patent Number: 5,870,141
[45] Date of Patent: Feb. 9, 1999

[54] MOTION VECTOR DETECTION CIRCUIT AND OBJECT TRACKING CAMERA APPARATUS

[75] Inventors: Hideki Matsumura, Kyoto; Akio Kobayashi, Hirakata, both of Japan

[73] Assignee: Sanyo Electric Co., Ltd., Moriguchi, Japan

[21] Appl. No.: 703,785

[22] Filed: Aug. 27, 1996

[30] Foreign Application Priority Data

Aug. 28, 1995 [JP] Japan ................................. 7-218598

[51] Int. Cl.$^6$ ................................................ H04N 7/18
[52] U.S. Cl. ........................ 348/169; 348/208; 348/699
[58] Field of Search .................................. 348/699, 416, 348/415, 409, 402, 401, 400, 169, 208, 352; H04N 7/18

[56] References Cited

U.S. PATENT DOCUMENTS

| | | | |
|---|---|---|---|
| 5,361,104 | 11/1994 | Ohki | 348/416 |
| 5,389,918 | 2/1995 | Kusaka et al. | 348/208 |
| 5,650,819 | 7/1997 | Sato et al. | 348/240 |

FOREIGN PATENT DOCUMENTS

7-322126  12/1995  Japan .

*Primary Examiner*—Bryan Tung
*Attorney, Agent, or Firm*—Armstrong, Westerman, Hattori, McLeland & Armstrong

[57] ABSTRACT

A motion vector detection circuit includes a single representative point memory into which representative point data at a preceding frame of all of a plurality of detection blocks formed in a motion vector detection area in an overlapped manner are written. All pixel data at a current frame of the motion vector detection area are written into a single pixel memory. The representative point data are selectively read-out from the representative point memory, and the pixel data of a detection block corresponding to the selected representative point data are read-out from the pixel memory. Then, correlation of the selected representative point data between the pixel data is determined by a correlator, whereby a motion vector can be detected. Since all the representative point data and all the pixel data in the motion vector detection area are respectively written into the representative point memory and the pixel memory, it is possible to reduce the number of components and a cost.

16 Claims, 8 Drawing Sheets

MOTION VECTOR DETECTION CIRCUIT AND OBJECT TRACKING CAMERA APPARATUS

BACKGROUND OF THE INVENTION

1. Field of the Invention

The present invention relates to a motion vector detection circuit and an object tracking camera apparatus using the same. More specifically, the present invention relates to a motion vector detection circuit in which a motion vector of an object is detected by determining correlation of pixel data in a plurality of detection blocks formed in a motion vector detection area between representative point data of the detection blocks, respectively, and an object tracking camera apparatus using such a motion vector detection circuit.

2. Description of the Prior Art

One example of conventional such a kind of motion vector detection circuit and object tracking camera apparatus are disclosed in, for example, Japanese Patent Application Laying-Open No. 7-322126 [H04N 5/232, H04N 5/225] laid-open on Dec. 8, 1995. In the prior art, a plurality of detection blocks are formed in a motion vector detection area in an overlapped manner, and there are provided with latch circuits for latching pixel data at a current frame of the respective detection blocks, latch circuits for latching representative point data at a preceding frame of the respective detection blocks, and correlators for determining correlation of latched pixel data between latched representative point data for each of detection blocks, and a motion vector is then detected on the basis of outputs of the correlators.

However, since it is necessary to provide two latch circuits and one correlator for each detection block, there was a problem that the number of the components becomes large, and therefore, a cost is high.

SUMMARY OF THE INVENTION

Therefore, a principal object of the present invention is to provide a novel motion vector detection circuit.

Another object of the present invention is to provide a motion vector detection circuit capable of reducing a cost.

A further object of the present invention is to provide an object tracking camera apparatus using the novel motion vector detection circuit.

According to the first invention, a motion vector detection circuit comprises: a pixel memory which has a memory size associated with a motion vector detection area, and stores pixel data of all of a plurality of detection blocks formed in said motion vector detection area in a manner that portions of respective detection blocks are overlapped with each other; a representative point memory which stores representative point data of all of said plurality of detection blocks; first reading means which selectively reads-out the pixel data in association with respective one of said detection blocks from said pixel memory; second reading means which reads-out the representative point data in association with selected pixel data from said representative point memory; and correlation means which receives the selected pixel data and read-out representative point data, and determines correlation of the data.

A plurality of detection blocks respectively having representative points A1 to A4, B1 to B4, C1 to C4 and D1 to D4 are formed in the motion vector detection area in a manner that portions of the detection blocks are overlapped with each other. The pixel memory has a memory size equal to the motion vector detection area, for example, and all the pixel data of all the detection blocks are stored therein, for example. Furthermore, the representative point data of all the detection blocks, that is, the pixel data of the representative points A1 to D4 are stored in the representative point memory. The pixel data stored in the pixel memory are selectively read-out in correspondence to the respective detection blocks by the first reading means, and the representative point data corresponding to the selected pixel data are read-out from the representative point memory by the second reading means. Then, the correlation of the selected pixel data between the read-out representative point data are determined by the correlation means. The motion vector is then detected on the basis of an output of the correlation means.

In an aspect of the present invention, the pixel data of the plurality of detection blocks, that is, the pixel data of the motion vector detection area are written into the pixel memory at every one line by the writing means. Furthermore, predetermined pixel data at a beginning of each line are inputted into the correlation means by the inputting means in synchronous with the writing of the pixel data into the pixel memory. The second reading means reads-out representative point data corresponding to the predetermined pixel data, and the correlation means determines the correlation of the predetermined pixel data between the read-out representative point data. Therefore, it becomes unnecessary to read-out the predetermined pixel data from the pixel memory.

In another aspect of the present invention, the first reading means reads-out the pixel data from the pixel memory at every one line. More specifically, the first reading means selectively reads-out the pixel data in accordance with the number and positions of the detection blocks overlapped on a line from which the pixel data are to be read-out.

In a preferred embodiment of the present invention, the first reading means includes a first counter and address generating means. The first counter is enabled for a predetermined period according to the number of the detection blocks overlapped on the line from which the pixel data are to be read-out, and incremented at every one pixel. That is, since the number of the overlapped detection blocks is varied in the motion vector detection area, a period for enabling the first counter is changed in accordance with the number of the overlapped detection blocks. Furthermore, the address generating means generates reading addresses for the pixel memory in accordance with a count value of the first counter and the position of the detection block overlapped on the line from which the pixel data are to be outputted.

According to the second invention, an object tracking camera apparatus comprises: an optical lens; pixel data outputting means which outputs pixel data on the basis of an object image outputted from said optical lens; a pixel memory which has a memory size associated with a motion vector detection area, and stores said pixel data of all of a plurality of detection blocks formed in said motion vector detection area in a manner that portions of respective detection blocks are overlapped with each other; a representative point memory which stores representative point data of all of said plurality of detection blocks; first reading means which selectively reads-out said pixel data in association with respective one of said detection blocks from said pixel memory; second reading means which reads-out the representative point data in association with said selected pixel data from said representative point memory; and correlation means which receives said selected pixel data and read-out representative point data, and determines correlation of the data; motion vector generating means which generates a motion vector on the basis of a determination result of said correlation means; and control means which controls said optical lens in accordance with said motion vector.

The object image is captured by the optical lens, and the pixel data on the basis of the object image is outputted from the pixel data outputting means. The pixel data at a current frame, for example, are stored in the pixel memory, and the representative point data at a preceding frame, for example, are stored in the representative point memory. The pixel data and the representative point data are read-out by the first reading means and the second reading means. Thereafter, the correlation of the pixel data between the representative point data is determined by the correlation means, and the motion vector is generated on the basis of the determination result. The optical lens is controlled in accordance with the motion vector by the control means.

According to the first invention and the second invention, since the representative point data of the respective detection blocks and the pixel data of all the detection blocks in the motion vector detection area are written into the representative point memory and the pixel memory, respectively, it is possible to reduce the number of the components and the cost.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
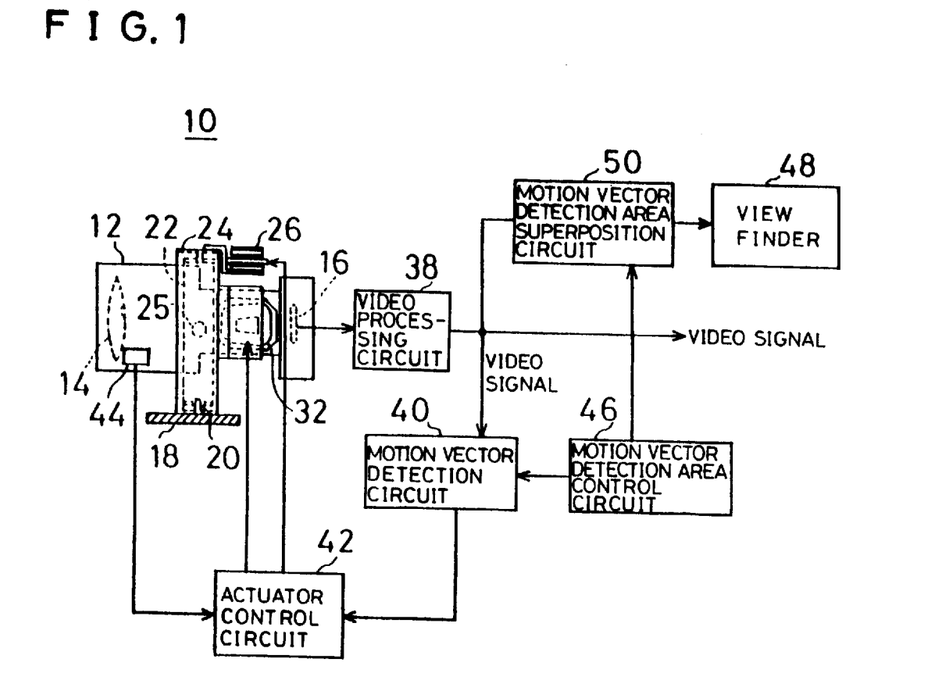
FIG. 1 is a block diagram showing an object tracking camera apparatus of an embodiment according to the present invention.
Figure 2:
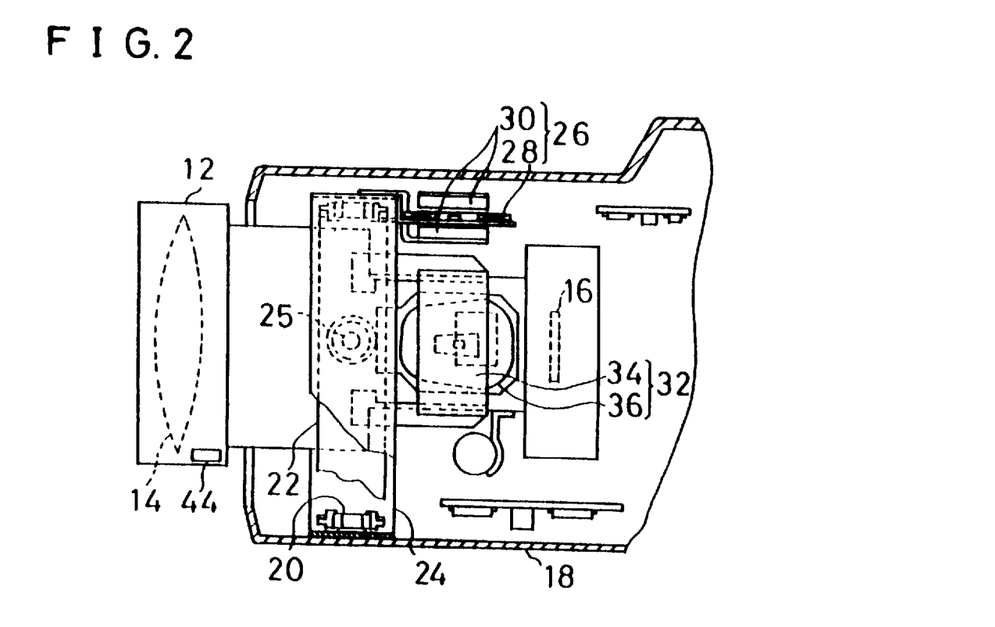
FIG. 2 is a cross section view showing a portion of the FIG. 1 embodiment.

An object tracking camera apparatus 10 of this embodiment shown in FIG. 1 includes a lens-barrel 12. As also understood from FIG. 2, a zoom lens 14 is mounted at a front portion of the lens-barrel 12, and a CCD 16 is mounted at a rear portion of the lens-barrel 12. The lens-barrel 12 is supported by a first frame 22, and the first frame 22 is supported by a second frame 24. Furthermore, the second frame 24 is attached to a housing 18. Accordingly, the lens-barrel 12 is rotatable around an axis 20 in a yawing direction, and is rotatable around an axis 25 in a pitching direction. A first actuator 26 includes a coil 28 attached to the first frame 22 and a magnet 30 attached to the second frame 24, and rotates the lens-barrel 12 in the yawing direction against the housing 18. A second actuator 32 includes a magnet 34 attached to the first frame 22 and a coil 36 attached to the lens-barrel 12, and rotates the lens-barrel 12 in the pitching direction against the housing 18.

A charge signal of an object outputted from the CCD 16 is converted into a composite video signal by a video processing circuit 38. A motion vector detection circuit 40 detects a motion vector indicating a motion direction and a size of an image in a motion vector detection area on the basis of the composite video signal. An actuator control circuit 42 controls the actuators 26 and 32 in accordance with the motion vector so as to track the object. A zoom position detection circuit 44 provided in the lens-barrel 12 includes a variable resistor (not shown). A value of the variable resistor is changed in response to a movement of the zoom lens 14, and a voltage corresponding to the value is applied to the actuator control circuit 42. Thus, a zoom position is detected by the zoom position detection circuit 44.

Furthermore, the motion vector detection circuit 40 forms the motion vector detection area in accordance with a control signal from a motion vector detection area control circuit 46. An image of the motion vector detection area superposed by a motion vector detection area super-position circuit 50 is outputted from a screen of a view finder 48 for monitoring the object. In addition, a position on which the motion vector detection are is superposed is controlled by the motion vector detection area control circuit 46.

Figure 3:
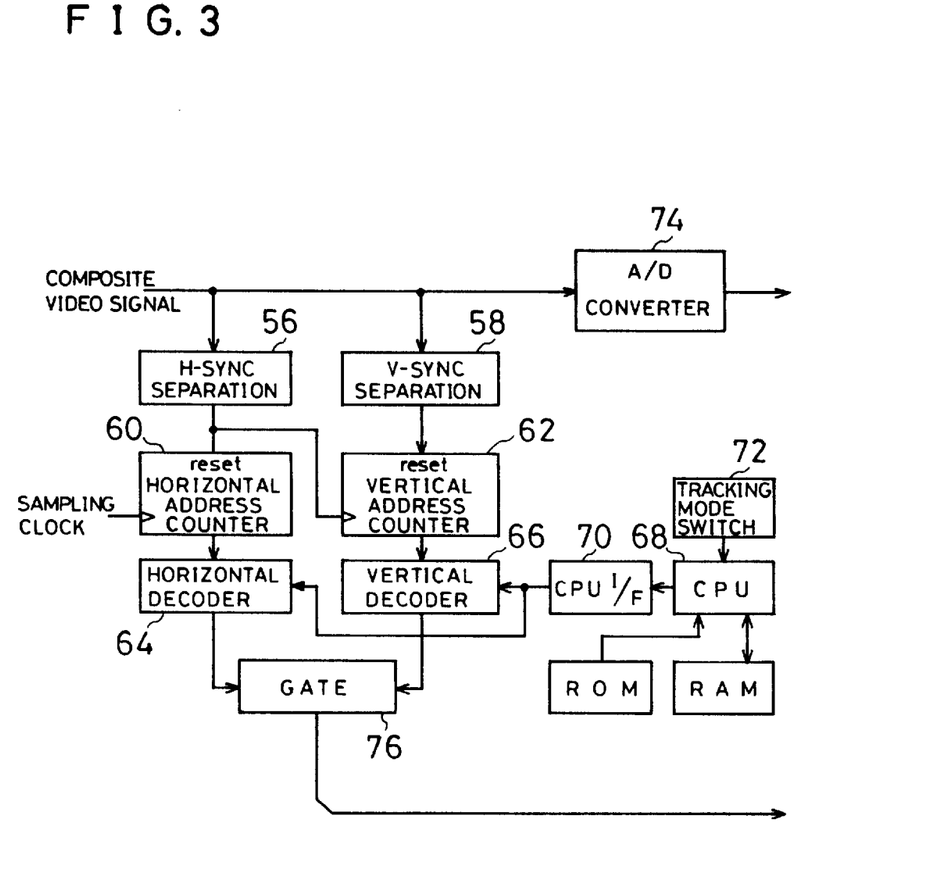
FIG. 3 is a block diagram showing a portion of a motion vector detection circuit included in FIG. 1 embodiment.
Figure 4:
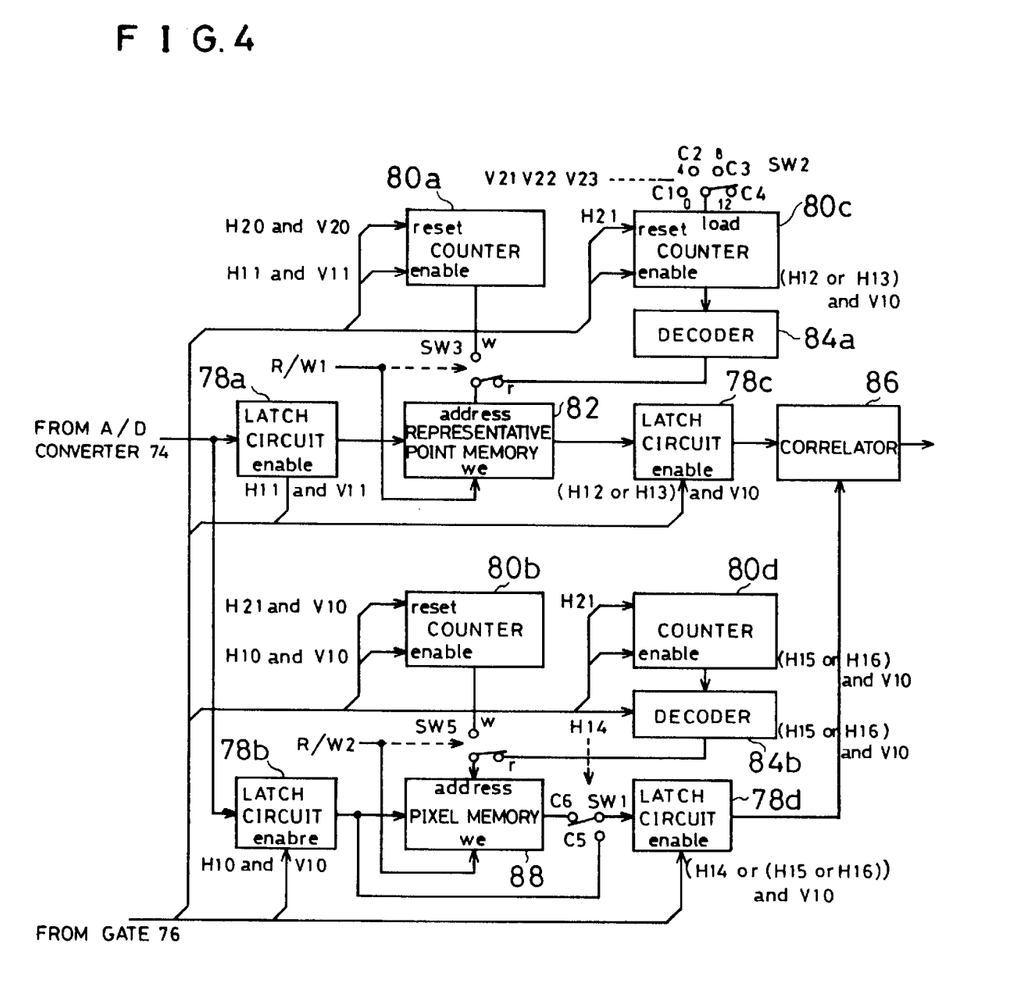
FIG. 4 is a block diagram showing a portion of the motion vector detection circuit.
Figure 5:
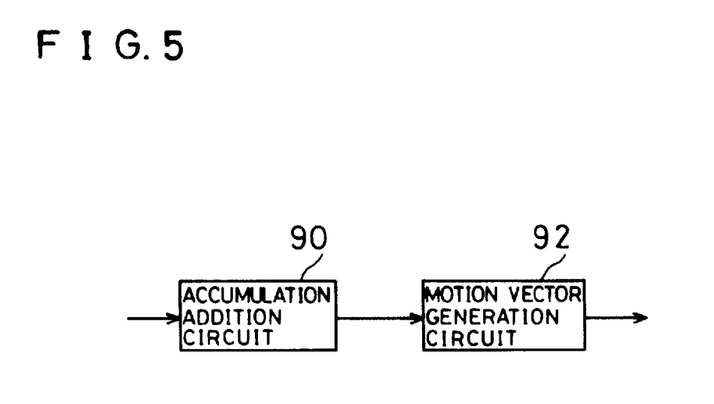
FIG. 5 is a block diagram showing a further portion of the motion vector detection circuit.
Figure 6:
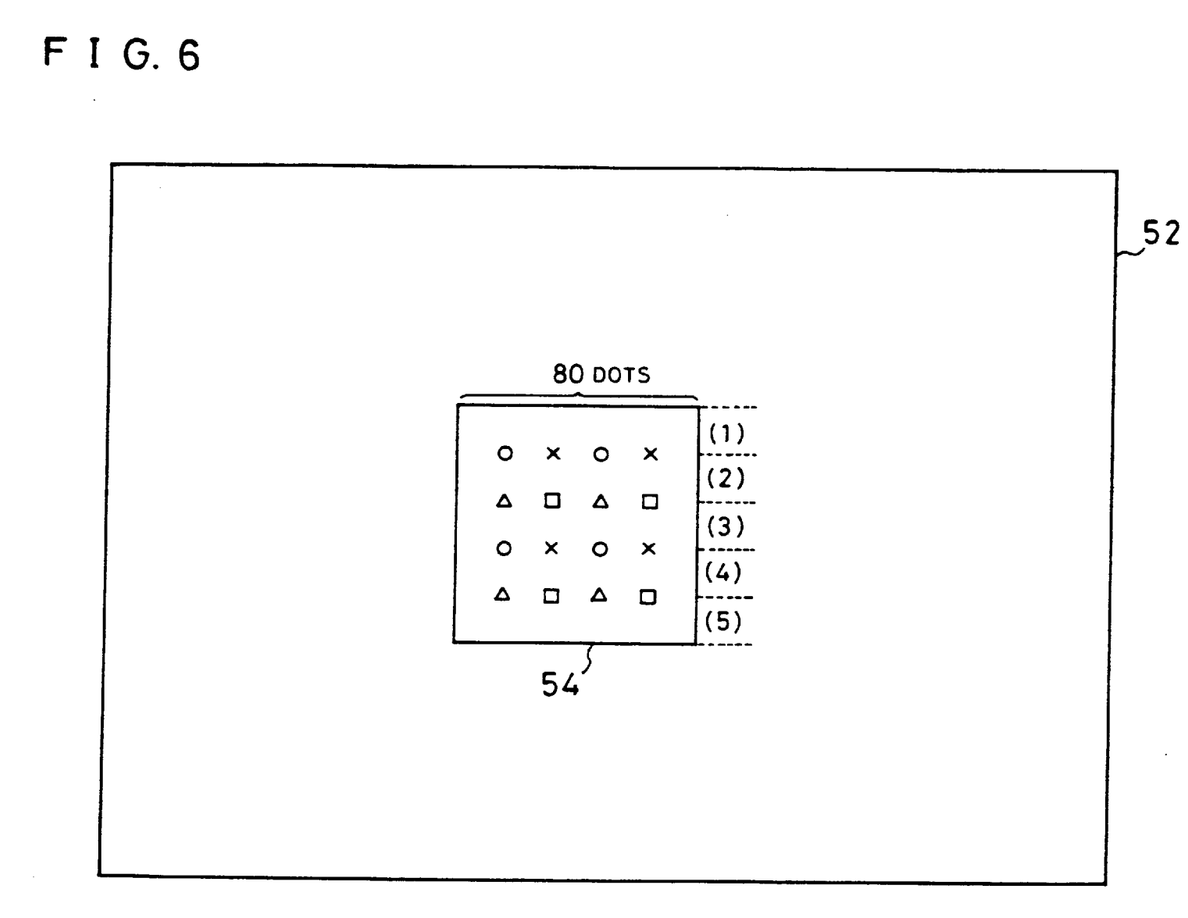
FIG. 6 is an illustrative view showing a motion vector detection area formed on a screen of a view finder.
Figure 7A:
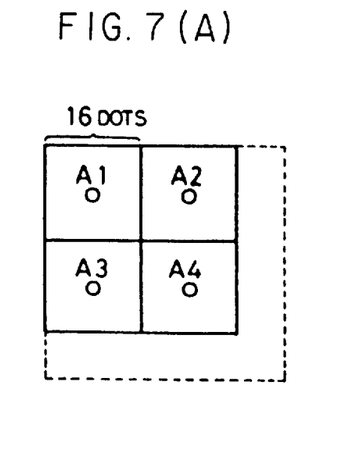
FIG. 7 is an illustrative view showing respective detection blocks formed in the motion vector detection area is an overlapped manner.
Figure 7B:
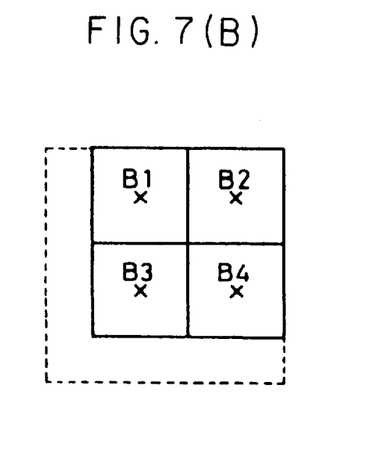
Figure 7C:
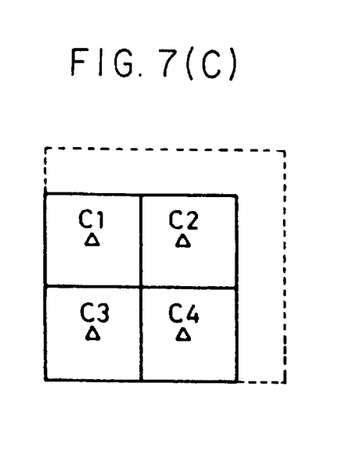
Figure 7D:
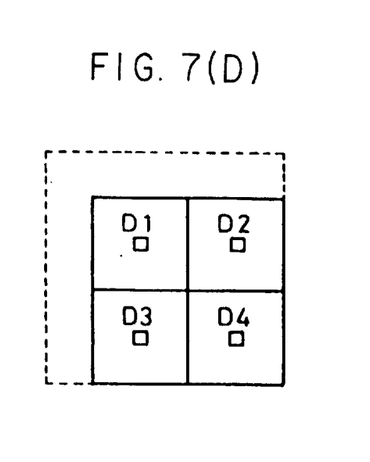

The motion vector detection circuit 40 is of detecting the motion vector with utilizing a representative point matching method, for example, and is constituted as shown in FIG. 3 to FIG. 5. As shown in FIG. 6 and FIG. 7, the motion vector detection area 54 of an almost square is formed on the screen 52 of the view finder 48, and sixteen detection blocks are formed in the motion vector detection area 54 such that portions of the detection blocks are overlapped with each other. Then, representative points A1 to D4 indicated by "○,X,Δ,□" are set at centers of the detection blocks, respectively. In addition, the motion vector detection area 54 has eighty (80) pixels in each of a column or vertical direction and a row or horizontal direction, and each of the detection blocks has sixteen (16) pixels in each of the column direction and the row direction.

Figure 8:
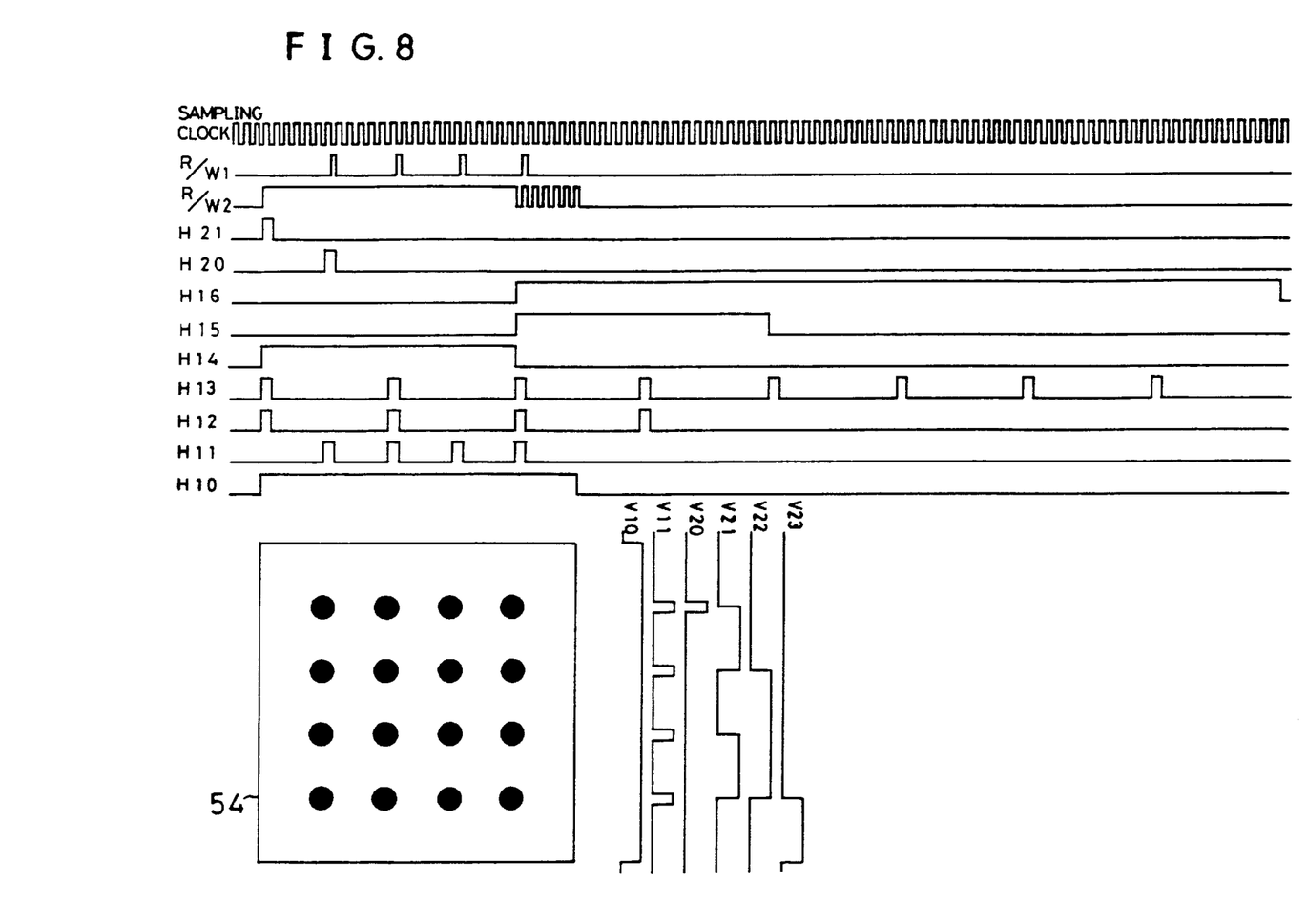
FIG. 8 is a timing chart showing a portion of an operation of FIG. 1 embodiment.

Returning back to FIG. 3, a horizontal synchronization signal included in the composite video signal as inputted is separated by a horizontal synchronization separation circuit 56 to be applied to a reset terminal of a horizontal address counter 60 and a clock terminal of a vertical address counter 62. A vertical synchronization signal included in the composite video signal is separated by a vertical synchronization separation circuit 58 to be applied to a reset terminal of the vertical address counter 62. In addition, a sampling clock which is shown in FIG. 8 and has one cycle equal to one pixel period is applied to a clock terminal of the horizontal address counter 60. Count values of the horizontal address counter 60 and the vertical address counter 62 are applied to a horizontal decoder 64 and a vertical decoder 66, respectively, and coordinates data at a right upper corner of the motion vector detection area is applied to the decoders 64 and 66 from a CPU 68 through a CPU interface 70.

In addition, the coordinates data is outputted at a time that a tracking mode switch 72 is turned-on. Furthermore, the motion vector detection area 54 is moved in the screen 52 in accordance with a control operation by an operator, and therefore, the coordinates data is changed in response to a movement of the area 54.

The horizontal decoder 64 receives the count value of the horizontal address counter 60 and the coordinates data, and outputs pulses H10 to H21 and read/write clocks R/W1 and R/W2 shown in FIG. 8. The vertical decoder 66 receives the count value of the vertical address counter 62 and the coordinates data, and outputs pulses V10 to V23 shown in FIG. 8. Then, such pulses and clocks are applied to latch circuits 78a to 78d, counters 80a to 80d, a representative point memory 82, a pixel memory 88 and etc. through a gate circuit 76. In addition, each of the read/write clocks R/W1 and R/W2 functions as a read signal and a write signal at a low level and a high level, respectively.

The composite video signal is converted into video data by an A/D converter 74 to be latched by the latch circuit 78a in response to an ANDed signal of the pulses H11 and V11 outputted from the gate circuit 76. Therefore, pixel data of the sixteen representative points A1 to D4 included in the motion vector detection area 54, that is, representative point data, are latched by the latch circuit 78a. The representative point data as latched are written into a first memory area of the representative point memory 82 having memory areas for two frames (32 dots) in response to the read/write clock R/W1 and an address data outputted from the counter 80a. The counter 80a is incremented by the sampling clock at a time that the ANDed signal of the pulses H11 and V11 is a high level, and reset by an ANDed signal of the pulses H20 and V20. The representative point data stored in the first memory area are read-out with being delayed by one frame, and another representative point data outputted from the latch circuit 78a are written into a second memory area at the same time as the reading of a first memory area. Thereafter, the writing and the reading are alternately repeated in or out the first memory area and the second memory area. In addition, since the read/write clock R/W1 becomes a high level only in a second half of a period that the pulse H11 becomes a high level, the representative point data at a preceding frame are read-out in a first half of the period, and the representative point data at a current frame are written in the second half of the period.

In reading-out the representative point data at the preceding frame from the representative point memory 82, the decoder 84a outputs a read address signal in response to the count value of the counter 80c. More specifically, the counter 80c is incremented by the sampling clock and reset by the pulse H21 at a time that an ANDed signal of the pulses H12 and V10 or an ANDed signal of the pulses H13 and V10 outputted from the gate circuit 76 is a high level. In addition, the ANDed signal of the pulses H12 and V10 is applied to an enable terminal of the counter 80c during a period that the pixel data at the current frame of detection areas (1) and (5) shown in FIG. 6 are applied to the latch circuit 78d, and the ANDed signal of the pulses H13 and V10 is applied to the enable terminal during a period that the pixel data at the current frame of detection areas (2) to (4) are applied to the latch circuit 78d. A switch SW2 is connected to a terminal C1 at a time that the pulses V21, V22 and V23 are "0", "0" and "0", or "1", "0" and "0", respectively, or to a terminal C2 at a time that such pulses are "0", "1" and "0", respectively, or to a terminal C3 at a time that such pulses are "1", "1" and "0", or to a terminal C4 at a time that such pulses are "0", "0" and "1", respectively. Then, the counter 80c is set with an initial value of "0", "4", "8" or "12" at a time that the switch SW2 is connected to the terminals C1, C2, C3 or C4, respectively.

Accordingly, with referring to Table 1, the counter 80c is incremented from "0" to "3" in each line at a time that the pixel data of the detection area (1) shown in FIG. 6 are applied to the latch circuit 78d, and the decoder 84a outputs address data for the representative point data of the representative points A1, A2, B1 and B2 in response to the respective count values. The counter 80c is incremented from "0" to "7" in each line at a time that the pixel data of the detection area (2) are applied to the latch circuit 78d, and the decoder 84a outputs address data for the representative point data of the representative points A1, A2, B1, B2, C1, C2, D1 and D2. At a time that the pixel data of the detection area (3) are applied to the latch circuit 78d, the counter 80c is incremented from "4" to "11" in each line, and the decoder 84a outputs address data for the representative point data of the representative points C1, C2, D1, D2, A3, A4, B3 and B4. At a time that the pixel data of the detection area (4) are applied to the latch circuit 78d, the counter 80c is incremented from "8" ton "15" in each line, and the decoder 84a outputs address data for the representative point data of the representative points A3, A4, B3, B4, C3, C4, D3 and D4. The counter 80c is incremented from "12" to "15" in each line at a time that the pixel data of the detection area (5) are applied to the latch circuit 78d, and the decoder 84a outputs address data for the representative point data of the representative points C3, C4 and D3 and D4.

TABLE 1

(1)

| counter 80c | 0 | 1 | 2 | 3 | | | | |
|---|---|---|---|---|---|---|---|---|
| decoder 84a | A1 | A2 | B1 | B2 | | | | |

(2)

| counter 80c | 0 | 1 | 2 | 3 | 4 | 5 | 6 | 7 |
|---|---|---|---|---|---|---|---|---|
| decoder 84a | A1 | A2 | B1 | B2 | C1 | C2 | D1 | D2 |

(3)

| counter 80c | 4 | 5 | 6 | 7 | 8 | 9 | 10 | 11 |
|---|---|---|---|---|---|---|---|---|
| decoder 84a | C1 | C2 | D1 | D2 | A3 | A4 | B3 | B4 |

(4)

| counter 80c | 8 | 9 | 10 | 11 | 12 | 13 | 14 | 15 |
|---|---|---|---|---|---|---|---|---|
| decoder 84a | A3 | A4 | B3 | B4 | C3 | C4 | D3 | D4 |

(5)

| counter 80c | 12 | 13 | 14 | 15 |
|---|---|---|---|---|
| decoder 84a | C3 | C4 | D3 | D4 |

Desired representative point data are selectively outputted from the representative point memory 82 in accordance with such the address data and the read/write clock R/W1, and the representative point data are latched by the latch circuit 78c in response to the ANDed signal of the pulses H12 and V10 or the ANDed signal of the pulses H13 and V10. In addition, the ANDed signal of the pulses H12 and V10 is applied to the latch circuit 78c for a period that the pixel data of the detection areas (1) and (5) are applied to the latch circuit 78d, and the ANDed signal of the pulses H13 and V10 are applied to the latch circuit 78c for a period that the pixel data of the detection areas (2) to (4) are applied to the latch circuit 78d. Then, the representative point data outputted from the latch circuit 78c are applied to the correlator 86.

The composite video data outputted from the A/D converter 74 is also latched by the latch circuit 78b in response to an ANDed signal of the pulses H10 and V10. Accordingly, all the pixel data of the motion vector detection area 54 are outputted from the latch circuit 78b. The pixel data are written into the pixel memory 88 in accordance with the read/write clock R/W2 and address data outputted from the counter 80b. The counter 80b is incremented by the sampling clock at a time that the ANDed signal of the pulses H10 and V10 applied to an enable terminal of the counter 80b is a high level, and reset by an ANDed signal of the pulses H21 and V10. In addition, the pixel memory 88 has a memory size equal to the motion vector detection area 54, and is divided into memory areas (1) to (5) in correspondence with the detection areas (1) to (5) shown in FIG. 6.

The pixel data outputted from the latch circuit 78b are also applied to a terminal C5. The pulse H14 is a high level during a period equal to ⅕ of a width of the motion vector detection area 54 in each line, and the switch SW1 is connected to the terminal C5 during the period. Therefore, the pixel data of beginning two adjacent detection blocks which are overlapped on each line are inputted to the latch circuit 78d through the terminal C5. Thus, since a portion of the pixel data outputted from the latch circuit 78b are directly applied to the latch circuit 78d, it becomes unnecessary to read-out the pixel data from the pixel memory 88. Then, at the time that an input of the pixel data from the terminal C5 is completed, the pulse H14 becomes a low level, and the switch SW1 is connected to a terminal C6.

Address data in the horizontal direction are outputted from the decoder 84b in response to the read/write clock R/W2 and count values of the counter 80d which is incremented from "0" to "63", whereby the pixel data stored in the pixel memory 88 are read-out in succession to the pixel data from the terminal C5. Accordingly, the Read/Write clock R/W2 is altered at every one clock for reading and writing the pixel data during a period equal to ⅕ of the width of the motion vector detection area 54 from a time that the switch SW1 is switched to the terminal C6. The counter 80d is incremented by the sampling clock at a time that an ANDed signal of the pulses H15 and V10 or an ANDed signal of the pulses H16 and V10 is a high level, and reset by the pulse H21. More specifically, the ANDed signal of the pulses H15 and V10 is applied to an enable terminal of the counter 80d during a period for reading the pixel data of the memory areas (1) and (5), and the ANDed signal of the pulses H16 and V10 is applied to the enable terminal during a period for reading the pixel data of the memory areas (2) to (4). The decoder 84b also receives the same signals as the signals applied to the enable terminal. In addition, an address in the vertical direction of the pixel memory 88 is designated by address data outputted from a decoder (not shown) and incremented at every one line.

Therefore, as shown in Table 2, at a time that the pixel data are read-out from the memory area (1), the counter 80d is incremented from "0" to "63" at every one line, and the decoder 84b outputs address data from "16" to "79". Accordingly, the pixel data from the latch circuit 78b pass the switch SW1 in an order of arrow marks a1 and a2 shown in FIG. 9, and then, the pixel data stored in the pixel memory 88 are read-out in an order of arrow marks b1 and b2. At a time that the pixel data are read-out from the memory area (2), the counter 80d repeats the increment from "0" to "63" three times at every one line. The decoder 84d designates addresses from "16" to "79" in a first increment, the addresses from "0" to "63" in a second increment, the addresses from "16" to "79" in a third increment. Accordingly, the pixel data of the pixel memory 88 are read-out in an order of arrow marks b1, b2, c1, c2, d1 and d2 in succession to the pixel data applied to the latch circuit 78d in the order of the arrow marks a1 and a2. In addition, the decoder 84b distinguishes the memory areas (1) to (5) from each other by the ANDed signal of the pulses H15 and V10 and the ANDed signal of the pulses H16 and V10. That is, the decoder 84b changes its operation in reading-out the pixel data from the memory areas (1) and (5) and in reading-out the pixel data from the memory areas (2) to (4).

Figure 9:
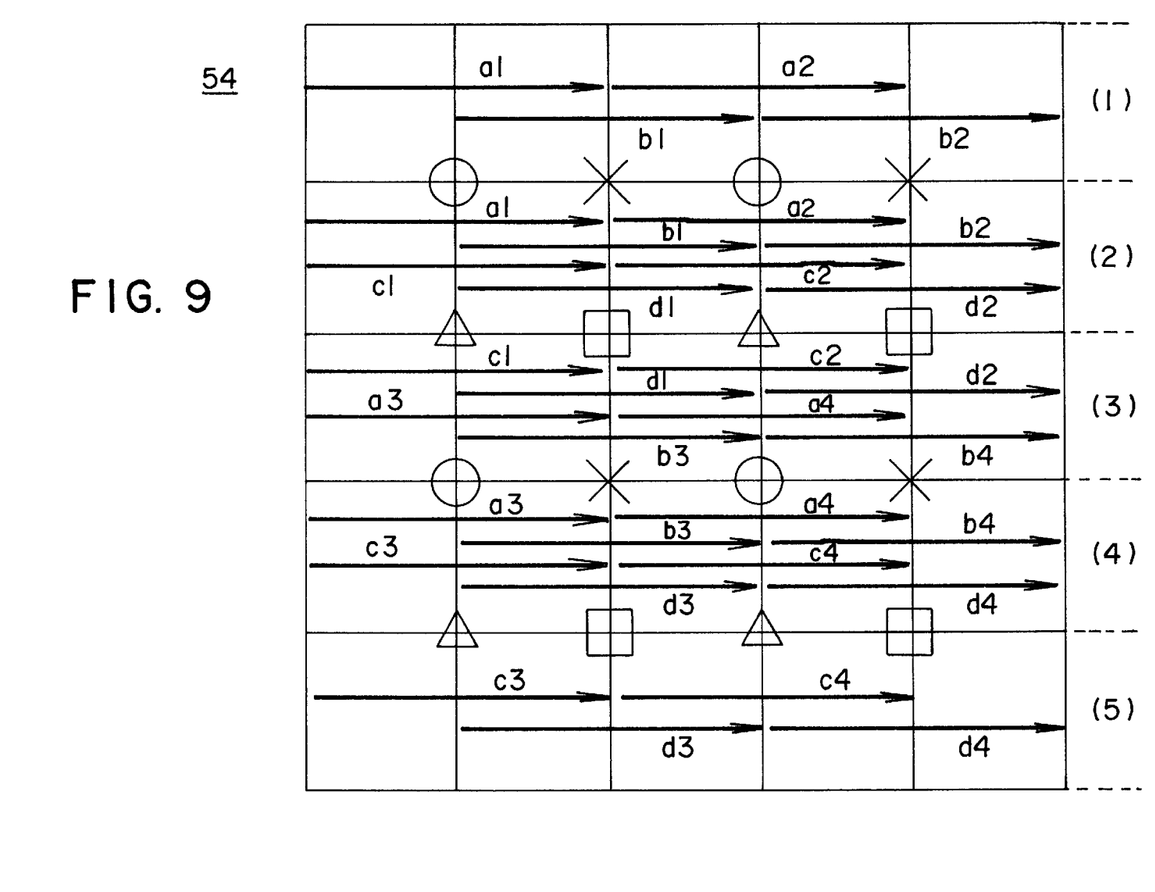
FIG. 9 is an illustrative view showing the motion vector detection area.

In reading-out the pixel data from the memory areas (3) and (4), the counter 80d repeats the increment in the same manner as that of the memory area (2), and the decoder 84b designates the addresses of the pixel memory 88 in the same manner as that of the memory area (2). Accordingly, the pixel memory 88 is scanned in an order of arrow marks d1, d2, a3, a4, b3 and b4 in succession to the pixel data of the arrow marks c1 and c2 in each line of the memory area (3). The pixel memory 88 is scanned in an order of arrow marks b3, b4, c3, c4, d3 and d4 in succession to the pixel data indicated by the arrow marks a3 and a4 in each line of the memory area (4). In reading-out the pixel data from the memory area (5), the counter 80d is incremented in the same manner as that of the memory area (1), and the decoder 84b also designates the addresses in the same manner as that of the memory area (1). Accordingly, the pixel data of the pixel memory 88 are read-out in an order of the arrow marks d3 and d4 in succession to the pixel data of the arrow marks c3 and c4.

TABLE 2

(1)

| | | | | | | | | |
|---|---|---|---|---|---|---|---|---|
| counter 80d | — | | 0–63 | | | | | |
| decoder 84b | — | | 16–79 | | | | | |
| | a1 | a2 | b1 | b2 | | | | |

(2)

| | | | | | | | | |
|---|---|---|---|---|---|---|---|---|
| counter 80d | — | | 0–63 | | 0–63 | | 0–63 | |
| decoder 84b | — | | 16–79 | | 0–63 | | 16–79 | |
| | a1 | a2 | b1 | b2 | c1 | c2 | d1 | d2 |

(3)

| | | | | | | | | |
|---|---|---|---|---|---|---|---|---|
| counter 80d | — | | 0–63 | | 0–63 | | 0–63 | |
| decoder 84b | — | | 16–79 | | 0–63 | | 16–79 | |
| | c1 | c2 | d1 | d2 | a3 | a4 | b3 | b4 |

(4)

| | | | | | | | | |
|---|---|---|---|---|---|---|---|---|
| counter 80d | — | | 0–63 | | 0–63 | | 0–63 | |
| decoder 84b | — | | 16–79 | | 0–63 | | 16–79 | |
| | a3 | a4 | b3 | b4 | c3 | c4 | d3 | d4 |

(5)

| | | | | |
|---|---|---|---|---|
| counter 80d | — | | 0–63 | |
| decoder 84b | — | | 16–79 | |
| | c3 | c4 | d3 | d4 |

At a time that the pixel data of the detection areas (1) and (5) shown in FIG. 6 are applied to the latch circuit 78d, the latch circuit 78d latches the pixel data in response to an ANDed signal of the pulses H14 and V10 and the ANDed signal of the pulses of H15 and V10. At a time that the pixel data of the detection areas (2) to (4) are applied to the latch circuit 78d, the latch circuit 78d latches the pixel data in response to the ANDed signal of the pulses H14 and V10 and the ANDed signal of the pulses H16 and V10. Accordingly, the pixel data for one line are outputted in an order of the arrow marks a1, a2, b1 and b2 from the latch circuit 78d in the detection area (1). The pixel data for one line are outputted in an order of the arrow marks a1, a2, b1, b2, c1, c2, d1 and d2 from the latch circuit 78d in the 20 detection area (2). The pixel data for one line are outputted in an order of the arrow marks c1, c2, d1, d2, a3, a4, b3 and b4 from the latch circuit 78d in the detection area (3). The pixel data for one line are outputted in an order of the arrow marks a3, a4, b3, b4, c3, c4, d3 and d4 from the latch circuit 78d in the detection area (4). The pixel data for one line are outputted in an order of the arrow marks c3, c4, d3 and d4 from the latch circuit 78d in the detection area (5).

The correlator 86 determines the correlations of the representative point data of the representative points A1 to A4 between the pixel data of the arrow marks a1 to a4, respectively, the representative point data of the representative points B1 to B4 between the pixel data of the arrow marks b1 to b4, respectively, the representative point data of the representative points C1 to C4 between the pixel data of the arrow marks c1 to c4, respectively, and the representative point data of the representative points D1 to D4 between the pixel data of the arrow marks d1 to d4, respectively. That is, the correlator 86 evaluates absolute values of differences between the respective representative point data and the pixel data as applied according to the respective arrow marks in FIG. 9.

An accumulation addition circuit 90 makes addition of the absolute values having the same coordinates data in the respective detection blocks. More specifically, the accumulation addition circuit 90 has addresses equal to the number of the pixels included in each detection block, and addition values of the absolute values are written into the respective addresses. Then, an address in which a minimum addition value is stored is evaluated. Thereafter, a motion vector generation circuit 92 generates a motion vector on the basis of the address corresponding to the representative point and the evaluated address.

Accordingly, at a time that the object does not move, an addition value of the representative point becomes minimum, and no motion vector is generated. However, if the object moves, a direction and a distance from the address of the representative point to the address of the minimum addition value becomes a direction and a magnitude of a motion vector, and thus, the motion vector generation circuit 92 generates the motion vector having the direction and the magnitude.

As described above, the representative point data at the preceding frame of the representative points A1 to D4 included in the motion vector detection area 54 which is divided into the plurality of detection blocks which are overlapped with each other are written into the representative point memory 82, and all the pixel data at the current frame of the motion vector detection area 54 are written into the pixel memory 88. The representative point data stored in the representative point memory 82 are selectively read-out to be applied to the correlator 86, and the pixel data stored in the pixel memory 88 are read-out in correspondence with the selected representative point data to be applied to the correlator 86. Then, the motion vector is detected by determining the correlation of the selected representative point data between the read-out pixel data.

According to the above described embodiment, since all the representative point data and all the pixel data included in the motion vector detection area 54 are written into the representative point memory 82 and pixel memory 88, respectively, it is possible to reduce the number of the components and a cost.

In addition, though the pixel data are applied to the correlator 86 in the order of the arrow marks a1 to d4 as shown in FIG. 9 in this embodiment, it is needless to say that the pixel data can be applied to the correlator 86 in a different order under a condition that the pixel data as read-out are of corresponding to the representative point data is satisfied.

Furthermore, though the correlation of the representative point data between all the pixel data of the respective detection blocks are detected, the correlation of the representative point data between the pixel data at every second pixel in the respective detection blocks.

Furthermore, in the above described embodiment, the pixel memory 88 having a memory capacity equal to the motion vector detection area 54; however, a line memory having a memory capacity equal to one line in the motion vector detection area 54 may be utilized as the pixel memory 88. In addition, it is necessary to complete the reading-out of the pixel data at the current line prior to starting the writing of the pixel data at the succeeding line, and therefore, the motion vector detection area 54 is to be sufficiently smaller than the screen 52.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A motion vector detection circuit, comprising:

a single pixel memory which has a memory capacity associated with a motion vector detection area, and stores pixel data of a plurality of detection blocks formed in said motion vector detection area in a manner that portions of respective detection blocks are overlapped with each other, each of said detection blocks having a predetermined number of pixels including pixels shared with at least one other detection block in an overlapped portion;

a single representative point memory which stores representative point data of all of said plurality of detection blocks;

first reading means which selectively reads-out the pixel data of said predetermined number of pixels in association with a respective one of said detection blocks from said pixel memory;

second reading means which reads-out the representative point data in association with said respective one of said detection blocks from said representative point memory; and correlation means which receives pixel data read-out by said first reading means and the representative point data read-out by said second reading means, and determines correlation between the pixel data and the representative point data.

2. A motion vector detection circuit according to claim 1, further comprising:

writing means for writing the pixel data of said detection blocks into said pixel memory at every one line; and inputting means for inputting predetermined beginning pixel data of each line in synchronous with writing of the pixel data into said pixel memory; wherein said second reading means reads-out representative point data associated with said predetermined pixel data, and said correlation means determines the correlation between said predetermined beginning pixel data and said read-out representative point data.

3. A motion vector detection circuit according to claim 1, wherein said first reading means reads-out said pixel data from said pixel memory at every one line.

4. A motion vector detection circuit according to claim 3, wherein said first reading means selectively reads-out said pixel data in accordance with the number of the detection blocks overlapped on a line from which said pixel data are to be read-out.

5. A motion vector detection circuit according to claim 3, wherein said first reading means selectively reads-out said pixel data in accordance with positions of the detection blocks overlapped on a line from which said pixel data are to be read-out.

6. A motion vector detection circuit according to claim 3, wherein said first reading means includes a first counter enabled for a predetermined period corresponding to the number of the detection blocks overlapped on a line from which said pixel data are to be read-out, and address generating means for generating read addresses of said pixel data in accordance with count values of said first counter and positions of the detection blocks overlapped on a line from which said pixel data are to be read-out.

7. A motion vector detection circuit according to claim 1, wherein said pixel memory has a memory capacity equal to said motion vector detection area, and the pixel data included in all of said plurality of detection blocks are stored in said pixel memory.

8. A motion vector detection circuit according to claim 1, wherein said pixel memory has a memory capacity equal to one line in said motion vector detection area, said pixel memory temporally storing the pixel data of said plurality of detection blocks one by one line.

9. An object tracking camera apparatus, comprising:

an optical lens;

pixel data outputting means which outputs pixel data on the basis of an object image outputted from said optical lens;

a single pixel memory which has a memory capacity associated with a motion vector detection area, and stores said pixel data of a plurality of detection blocks formed in said motion vector detection area in a manner that portions of respective detection blocks are overlapped with each other, each of said detection blocks having a predetermined number of pixels including pixels shared with at least one other detection block in an overlapped portion;

a single representative point memory which stores representative point data of all of said plurality of detection blocks;

first reading means which selectively reads-out said pixel data of said predetermined number of pixels in association with respective one of said detection blocks from said pixel memory;

second reading means which reads-out the representative point data in association with said respective one of said detection blocks from said representative point memory; and correlation means which receives pixel data read-out by said first reading means and the representative point data read-out by said second reading means, and determines correlation between the pixel data and the representative point data;

motion vector generating means which generates a motion vector on the basis of a determination result of said correlation means; and control means which controls said optical lens in accordance with said motion vector.

10. An object tracking camera apparatus according to claim 9, further comprising:

writing means for writing the pixel data of said detection blocks into said pixel memory at every one line; and inputting means for inputting predetermined beginning pixel data of each line in synchronous with writing of the pixel data into said pixel memory; wherein said second reading means reads-out representative point data associated with said predetermined pixel data, and said correlation means determines the correlation between said predetermined beginning pixel data and said read-out representative point data.

11. An object tracking camera apparatus according to claim 9, wherein said first reading means reads-out said pixel data from said pixel memory at every one line.

12. An object tracking camera apparatus according to claim 11, wherein said first reading means selectively reads-out said pixel data in accordance with the number of the detection blocks overlapped on a line from which said pixel data are to be read-out.

13. An object tracking camera apparatus according to claim 11, wherein said first reading means selectively reads-out said pixel data in accordance with positions of the detection blocks overlapped on a line from which said pixel data are to be read-out.

14. An object tracking camera apparatus according to claim 11, wherein said first reading means includes a first counter enabled for a predetermined period corresponding to the number of the detection blocks overlapped on a line from which said pixel data are to be read-out, and address generating means for generating read addresses of said pixel data in accordance with count values of said first counter and positions of the detection blocks overlapped on a line from which said pixel data are to be read-out.

15. An object tracking camera apparatus according to claim 9, wherein said pixel memory has a memory capacity equal to said motion vector detection area, and the pixel data included in all of said plurality of detection blocks are stored in said pixel memory.

16. An object tracking camera apparatus according to claim 9, wherein said pixel memory has a memory capacity equal to one line in said motion vector detection area, said pixel memory temporally storing the pixel data of said plurality of detection blocks one by one line.

* * * * *